May 27, 1969     W. K. KIMMEL     3,446,015

GAS TURBINE FUEL METERING

Filed Oct. 18, 1967

INVENTOR.
William K. Kimmel
BY
Paul Fitzpatrick
ATTORNEY

United States Patent Office 3,446,015
Patented May 27, 1969

3,446,015
GAS TURBINE FUEL METERING
William K. Kimmel, Indianapolis, Ind., assignor to General Motors Corporation, Detroit, Mich., a corporation of Delaware
Filed Oct. 18, 1967, Ser. No. 676,305
Int. Cl. F02c 9/06, 9/08
U.S. Cl. 60—39.28          2 Claims

ABSTRACT OF THE DISCLOSURE

The fuel control for a free turbine-type gas turbine engine includes a gas producer control and a power turbine governor connected in series between a source of fuel under pressure and the combustion apparatus of the engine. The power turbine governor valve has a minimum fuel flow stop and has connected in parallel with it a head regulating by-pass valve which controls the head across the governor valve. An orifice in series with the head regulating valve causes the head across the governor valve to increase as greater quantities of fuel are diverted through the by-pass, with the result that the minimum flow upon major decrease of load on the power turbine or reduction in power control setting is greater when the gas generator turbine speed is higher. Thus, the minimum fuel flow schedule responds to gas generator speed.

My invention relates to fuel controls or fuel metering devices for gas turbine engines, particularly those of the free turbine type. These are engines in which a gas producer, ordinarily comprising a compressor, combustion apparatus, and a compressor-driving turbine, supplies motive gases to a power turbine rotatable at a speed independent of that of the gas producer. In such engines it is necessary to control fuel so as not to overheat the gas producer turbine or cause surging of the compressor. It is also necessary to control fuel in response to load on the power turbine so that it will receive sufficient energy from the gas producer to drive the load at the desired speed, so far as this is possible without overfueling the gas producer turbine.

One known mode of control for such an engine is to provide a gas producer control which responds directly or indirectly to the speed of the gas producer turbine and other conditions to establish a maximum fuel flow schedule for acceleration, and ordinarily a minimum fuel flow schedule for deceleration. Fuel also is controlled by a power turbine governor which acts to modulate the fuel below the limit established by the gas producer control so as to provide the correct amount of motive fluid to drive the power turbine at the desired speed. Thus, either the gas producer control or the power turbine governor may limit fuel. On acceleration, the gas producer control limits fuel, and in steady state operation or upon a rapid decrease in the load on the engine or the governor limits fuel.

In a known prior fuel control, the power turbine governor embodies a speed-responsive throttling valve connected in parallel with a head regulating valve of common type which serves to maintain a constant pressure drop across the power turbine governor valve. The valve can close only to a predetermined minimum opening, so as not to shut off fuel and stop the engine. With this control, the minimum flow which results upon rapid decrease of the load is strictly a function of power turbine speed and independent of gas producer turbine speed. This is undesirable, since it may result in starving the gas generator turbine by a too great or sudden decrease in fuel upon rapid decrease of power turbine load or power setting, causing flameout and total loss of power.

I have conceived that it is possible to overcome this disadvantage of the prior fuel control by providing means associated with the power turbine governor to cause the minimum fuel flow to be a function of gas producer speed. Specifically, this is accomplished very simply by providing an orifice in series with the head regulating by-pass valve so that the total head across the power turbine governor varies with the flow by-passed by the head regulating valve and, therefore, varies with total fuel flow established by the gas producer control. This fuel flow increases with gas producer speed. Thus, the minimum fuel flow established when the power turbine governor closes to its minimum area increases with gas producer speed, and the danger of flameout due to an abrupt loss in load when the gas producer is accelerating or operating as higher speeds is obviated.

The principal object of my invention is to provide a fuel control or fuel metering means for a free turbine-type engine which is simple and performs satisfactory under all conditions of operation, particularly when the load is abruptly lessened from an accelerating condition. A further object of the invention is to provide a governing device for a turbine or other engine which has a speed modulation dependent upon the power level of a gas producer. A more specific object of my invention is to provide a control for a free turbine-type gas turbine engine in which the minimum fuel established by the power turbine governor is a function of gas producer speed.

The nature of my invention and the advantages thereof will be clear to those skilled in the art from the succeeding detailed description of the preferred embodiment of the invention and the accompanying drawings.

Figures 1, 2, 3:
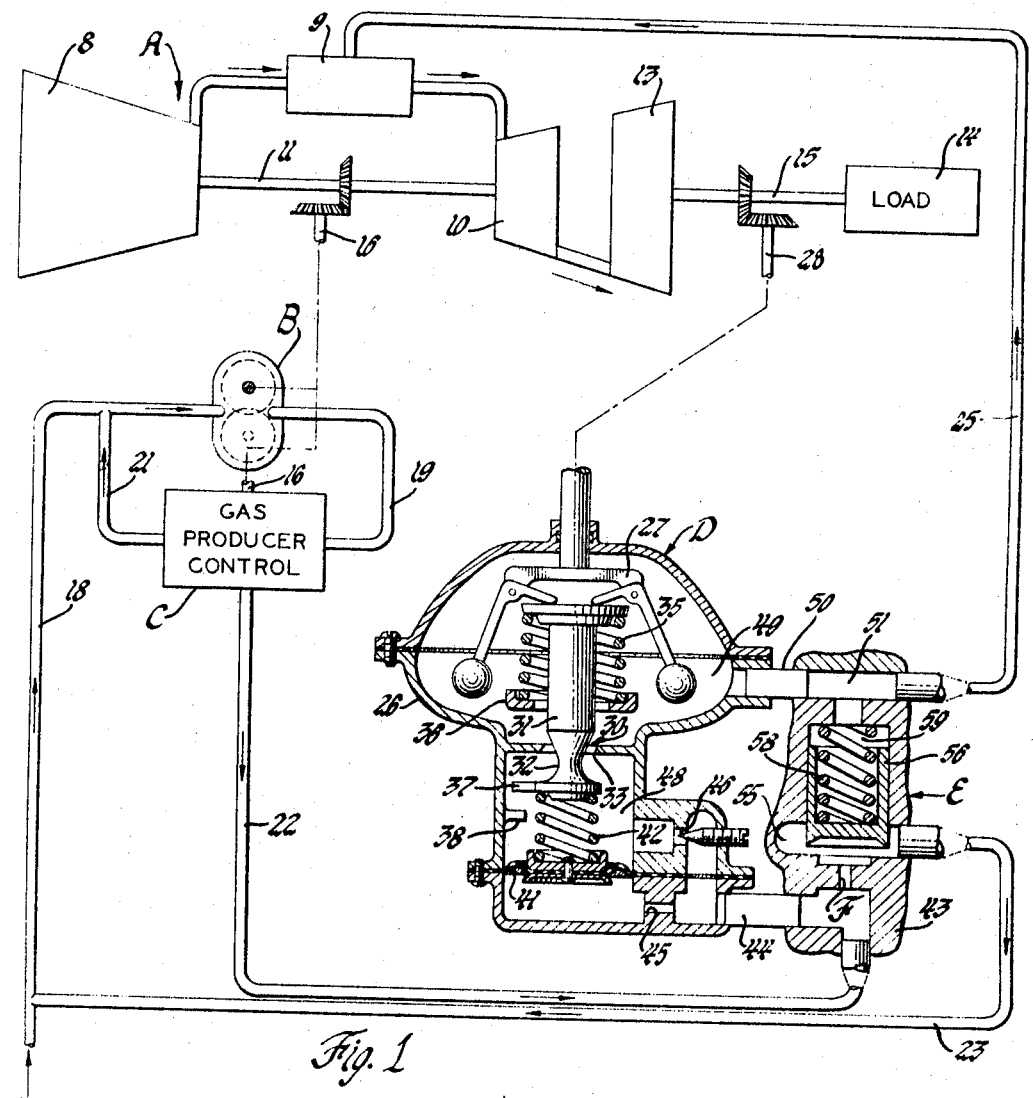
FIGURE 1 is a schematic diagram of the combination of a gas turbine engine and fuel control means embodying my invention.
FIGURE 2 is a graph of fuel flow as a function of gas producer and power turbine speeds according to the prior art control.
FIGURE 3 is a similar graph showing the characteristics of the control embodying my invention.

Referring first to FIGURE 1, the system includes a free turbine- or gas-coupled-type gas turbine engine A to which fuel is supplied by a suitable pump B. The engine includes a gas producer made up of a compressor 8, a combustion apparatus 9, and a turbine 10 connected through a shaft 11 to the compressor. Hot gas under pressure exhausting from turbine 10 is supplied to a power turbine 13 which drives a load 14 through a shaft 15 and, if desired, suitable gearing. The load may be, for example, the lifting rotor of a helicopter. Pump B is driven through a power take-off shaft 16 from shaft 11. Power take-off shaft 16 also provides an input of gas producer speed to a gas producer control C. The control C may be of any suitable type which responds to parameters such as gas producer speed, ambient air pressure, air temperature, and the like, as is well known in the art, to limit the flow of fuel to the gas producers so as to avoid overtemperature and surge. Ordinarily, manual control of the power setting of control C is provided.

Fuel is supplied to pump B from any suitable source such as an aircraft boost pump through a supply line 18, and the pump delivers fuel under pressure through a line 19 to the control C. The fuel delivered by the pump in excess of the maximum allowable for acceleration of the gas producer is returned to the inlet of pump B through a line 21. The maximum fuel flow is discharged through line 22 to the governor valve D and head regulating valve E. These act to by-pass fuel to the pump supply line 18 through a second fuel return line 23. Valves D and E pass on to the combustion chamber 9, through a fuel line 25, the amount of fuel necessary to maintain the power turbine in operation at the speed for which the governor D is set. In the event of substantial overspeed of the power turbine, due either to a large reduction in the speed setting of governor D or to a substantial abrupt reduction in the load on the power turbine, the power turbine governor acts to close to the smallest opening available and thus meters a minimum fuel flow to the engine. Except for the improvement which is the subject of my invention, the structure of the power turbine governor and head regulating valve preferably follow prior art practice, and therefore these elements are shown schematically. They may be explained briefly as follows:

The power turbine governor includes a housing 26 on which is journaled a flyball device 27 driven by shafting 28 from the output shaft 15 of the power turbine. The flyball device acts to reciprocate a valve stem 31 including a contourned portion 32 which defines a variable fuel metering valve 30 with an annular opening 33 in a wall between two portions of housing 26. Valve stem 31 is biased by a speeder spring 35 acting against an abutment 36 which may be adjustable by suitable means (not illustrated) to vary the speed setting of the power turbine as desired. A suitable thrust bearing (not illustrated) is provided between the flyball device and stem 31. Closing movement of valve 30 is limited by a positive stop, such as engagement of a lug 37 on the valve stem with a boss 38 on the housing. Integrating or damping means for the governing valve 30 includes a diaphragm 41 mounted in the housing which provides an abutment for a compression spring 42 disposed between the diaphragm and valve stem 31.

The fuel line 22 enters the body 43 of the head regulating valve E and communicates through a line 44 with the governing valve. Fuel may flow from line 44 through a fixed orifice 45 to the rear side of diaphragm 41 an adjustable orifice 46 into a chamber 48 at the front of the diaphragm from which it flows through the valve 30 into a chamber 49, and through a line 50 and a passage 51 in the head regulating valve body to the engine fuel line 25. Diaphragm 41 responds to transients in fuel flow in known manner to reset or stabilize the governing valve. While desirable, it is not essential to use of my invention.

Line 22 carrying fuel from the gas producer control to the power turbine governor also is connected to the head regulating valve E through a minimum fuel flow correcting orifice F in valve body 43. This orifice is the feature contributed to the control by my invention. Orifice F connects to a valve seat 55 which cooperates with a reciprocable valve poppet 56 to define a by-pass valve which is directly connected to the fuel return line 23. Poppet 56 is biased to open valve E by the pressure below the poppet as illustrated and biased to close by a compression spring 58 and by the pressure in the chamber 59 above the poppet which is in open communication with passage 51. Chamber 59 thus contains fuel at engine supply pressure, which is also power turbine governing valve discharge pressure.

It will be seen, therefore, that the governor valve D has a pressure drop across it equal to the difference in head between lines 44 and 50, which we may call the metering head. One pressure acting upon the head regulating valve is the pressure in line 50, but the pressure operating on the lower end of the valve is the pressure in line 44 minus the pressure drop through the fuel flow correcting orifice F. Since the pressure difference across the head regulating valve is held constant, it follows that the metering head across the governing valve is a constant plus the pressure drop through orifice F.

The pressure drop through orifice F is closely proportional to the square of the flow through the orifice, which is the flow returned to the inlet of pump B through line 23. Put another way, the more the governing valve D acts to reduce fuel below the amount metered by control C, the greater is the metering head acting to force fuel through metering valve 30. The flow through 30 will be closely proportional to the square of the metering head at any fixed valve opening.

It is noted that there is a pressure drop across orifice 46 which varies in steady state operation with flow through the governing valve 30. However, since the pressure drop at 46 is a direct function of flow which is a direct function of the position of valve 31, this drop has only the effect of a variation in the taper of contoured portion 32. It does not affect the flow through the valve so as to interfere with the effect of the variation of metering head caused by flow through orifice F.

The effects of the improvement in fuel controls due to my invention may be appreciated by reference to FIGURES 2 and 3. FIGURE 2 illustrates the action of a prior art fuel control as illustrated in FIGURE 1 except lacking the minimum fuel flow correcting orifice F; or, in other words, one in which the regulating valve E responds directly to pressure in line 44. The horizontal lines M–N, O–P, and Q–R represent maximum or acceleration fuel flow established by the gas producer control at different values of gas producer speed, the rate of flow being greater at the higher speeds. In steady state operation, higher gas producer speed corresponds to a higher load on the power turbine, for a given power turbine speed setting. This flow is independent of power turbine speed during acceleration when the power turbine is below the governing speed. However, when power turbine speed reaches the power turbine governor setting, metering valve 30 begins to close to reduce fuel flow along the line N–P–R–S, the governor droop line. If, for example, there is substantially no load on the power turbine or the load decreases sufficiently, the metering valve 30 may close against the stop and, if there should be further increase in speed of the power turbine, the fuel flow will remain constant along the line S–T in FIGURE 2. This flow is determined by the constant minimum opening of the governing valve and the constant pressure head across the valve, and is thus independent of both power turbine and gas producer speeds. As a result, the minimum fuel flow to the gas producer is entirely independent of the speed of the gas producer at the time the governing valve closes. It is also independent of whether the gas generator was working at steady state or was on an acceleration curve.

Referring to FIGURE 3 showing the operation of my control, we have maximum fuel lines M–N, O–P, and Q–R as before, corresponding to acceleration fuel schedule for various gas generator speeds. In this case, however, there are separate approximately parallel droop lines depending upon the value of gas producer speed, these lines being indicated as N–S, P–S′, and R–S″. The fuel flow characteristic after the governor valve 30 closes correspondingly is represented by a family of lines S–T, S′–T′, and S″–T″ depending upon gas generator speed but invariant with power turbine speed. Thus, if the power turbine is heavily loaded and the gas generator running at high speed and the load is lost or the power level is cut to a low power setting, the fuel flow will drop to the line S–T initially and then will be gradually readjusted as the gas producer speed reduces in response to the reduction of flow by the power turbine governor. Ultimately, if the gas producer reaches the low speed represented by line Q–R, the fuel flow will be on the line S″–T‴ as in the previous control; but there is a gradual decrease from a high minimum to a basic minimum as the gas producer slows down rather than a sudden drop to the basic minimum as shown in FIGURE 2.

In this way, a suitable deceleration schedule for the engine is provided and flexibility of control is promoted, with freedom from danger of flameout as when the power control is shifted to or near idle or if the load is suddenly diminished as it may in certain conditions of helicopter maneuvering. It will be seen that the simple modification to the prior art control represented by the substitution of the fuel flow correcting orifice if for the previous open communication between the head regulating valve and the governor valve makes a very significant difference in the operating characteristics of the fuel control, making it suitable for helicopter installations and also for other uses where sudden changes in power settings or load may be encountered.

In FIGURE 3, a typical droop curve of the governor in response to gradual transients is represented by the broken line intersecting lines N–S, P–S′, and R–S″, whereas in FIGURE 2 such a line would coincide with line N–P–R–S. Normal governing action is not substantially altered. The benefits of the invention are primarily in improvement in response to large transients of power or speed setting or load.

Reference in the claims to a predetermined minimum opening of the governing valve means includes provision of a minimum fuel orifice by-passing the governing valve and acting as a partly open governing valve.

I claim:
1. The combination of:
   a gas turbine engine including a gas producer and a power turbine supplied by the gas producer;
   means for supplying fuel under pressure;
   a gas producer control connected between the fuel supplying means and the gas producer adapted to establish a limiting fuel schedule responsive to the power level of gas producer operation;
   power turbine governing means including governing valve means responsive to power turbine speed connected in series with the gas producer control between the fuel supplying means and the gas producer and including a head regulating valve connected in parallel with the valve means operable to divert fuel from the gas producer so as to maintain a constant pressure drop across the head regulating valve, the governing valve means having a predetermined minimum opening allowing flow to the gas producer; and
   a minimum fuel flow correcting orifice connected in series with the head regulating valve and in parallel with the governing valve means operative to modulate the head across the governing valve means as a function of flow through the orifice.

2. The combination of:
   a gas-coupled gas turbine including a gas producer comprising a compressor, a combustion chamber, and a compressor-driving turbine and including a power turbine supplied by the gas producer;
   means for supplying fuel under pressure;
   a gas producer control connected between the fuel supplying means and the combustion chamber adapted to establish an acceleration fuel schedule influenced by gas producer speed;
   power turbine governing means including governing valve means responsive to power turbine speed connected in series with the gas producer control between the fuel supplying means and the combustion chamber and including a head regulating valve connected in parallel with the governing valve means operable to divert fuel from the combustion chamber so as to maintain a constant pressure drop across the head regulating valve, the governing valve means having a predetermined minimum opening allowing flow to the combustion chamber; and
   a minimum fuel flow correcting orifice connected in series with the head regulating valve and in parallel with the governing valve means so that the pressure drop across the governing valve means increases as the rate of diversion of fuel increases.

References Cited
UNITED STATES PATENTS 3,106,934 10/1963 Rogers et al. _____ 60—39.28 X
3,152,444 10/1964 Peczkowski et al. __ 60—39.28 X JULIUS E. WEST, *Primary Examiner.*

PO-1050
(5/69)

UNITED STATES PATENT OFFICE
CERTIFICATE OF CORRECTION

Patent No. 3,446,015          Dated   May 27, 1969

Inventor(s)   William K. Kimmel

It is certified that error appears in the above-identified patent and that said Letters Patent are hereby corrected as shown below:

Column 1, line 59, before "limits" insert --speed setting, the power turbine governor--.

Column 2, line 18, change "as" to -- at --; line 29, after "fuel" insert -- flow --.

Column 3, line 21, delete "contourned" and substitute -- contoured --; line 39, after numeral "41" insert -- and through --.

Column 5, line 37, before "valve" insert -- governing --.

SIGNED AND
SEALED
MAR 31 1970

(SEAL)
Attest:

Edward M. Fletcher, Jr.
Attesting Officer

WILLIAM E. SCHUYLER, JR.
Commissioner of Patents